(12) United States Patent
Ramboyong et al.

(10) Patent No.: US 7,706,062 B2
(45) Date of Patent: Apr. 27, 2010

(54) DIRECT-VIEW, COMPACT SHORT WAVE INFRA RED (SWIR) VIEWER

(75) Inventors: Lenard V. Ramboyong, South Riding, VA (US); Yau L. Fung, Fairfax, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 84 days.

(21) Appl. No.: 11/532,476

(22) Filed: Sep. 15, 2006

(65) Prior Publication Data

US 2008/0296500 A1 Dec. 4, 2008

(51) Int. Cl.
G02B 23/00 (2006.01)
(52) U.S. Cl. ...................... 359/399; 359/363
(58) Field of Classification Search ......... 359/350–361, 359/399–431, 629–531, 896; 250/214 V, 250/330–332
See application file for complete search history.

(56) References Cited

U.S. PATENT DOCUMENTS 4,463,252 A * 7/1984 Brennan et al. ....... 250/214 VT
5,084,780 A * 1/1992 Phillips ...................... 359/350
5,943,174 A * 8/1999 Bryant et al. ............... 359/809
6,335,526 B1 * 1/2002 Horn ........................... 250/332
6,339,500 B1 * 1/2002 Carmi et al. ................ 359/399
6,560,029 B1 * 5/2003 Dobbie et al. ............... 359/631
6,762,884 B2 * 7/2004 Beystrum et al. ........... 359/629
7,051,469 B1 * 5/2006 Pochapsky et al. ............ 42/111

FOREIGN PATENT DOCUMENTS

GB 2 143 397 * 2/1985

OTHER PUBLICATIONS

Toomas H. Allik, "Status of Active and Passive Imagery with Slid State SWIR Camera Technology", Aug. 26, 2005.

* cited by examiner

Primary Examiner—Thong Nguyen
(74) Attorney, Agent, or Firm—Richard J. Kim; John H. Raubitschek

(57) ABSTRACT

A night vision device includes an objective lens assembly, an image detector assembly, an eyepiece lens assembly and a housing. The objective lens assembly receives low intensity light. The image detector assembly converts the low intensity light into a visible output image. The eyepiece lens assembly provides for viewing the output image from the image detector assembly. The housing receives the objective lens assembly, the image detector assembly, and the eyepiece lens assembly. Additionally, the housing aligns the objective lens assembly with the image detector assembly and the eyepiece lens assembly along an optical axis.

18 Claims, 10 Drawing Sheets

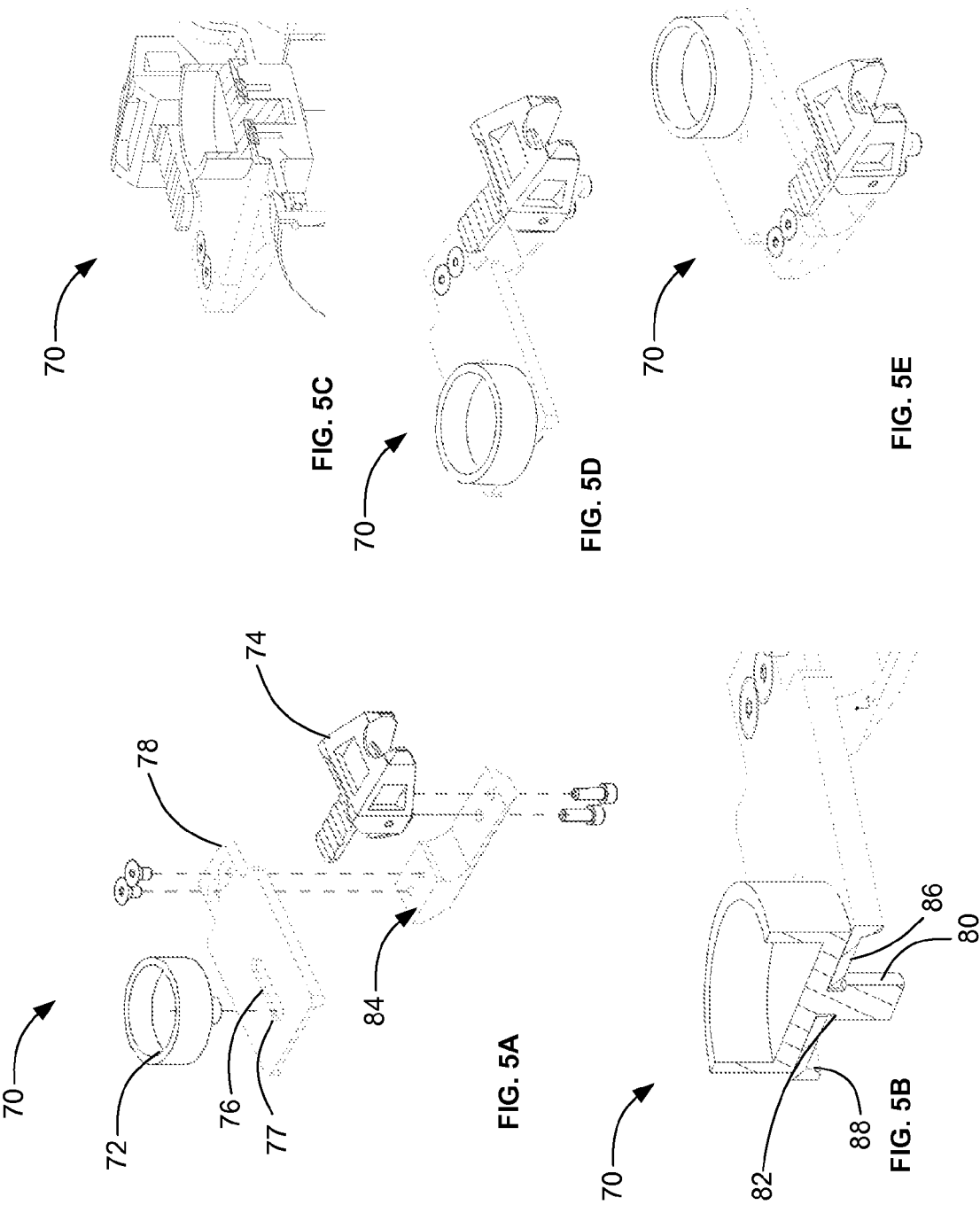

DIRECT-VIEW, COMPACT SHORT WAVE INFRA RED (SWIR) VIEWER

GOVERNMENT INTEREST

The invention described herein may be manufactured, used, sold, imported, and/or licensed by or for the Government of the United States of America.

FIELD OF THE INVENTION

The present invention generally relates to imaging devices that utilize wavelengths of the electromagnetic (EM) spectrum and more particularly to a direct-view, compact short wave infra red (SWIR) viewer.

BACKGROUND OF THE INVENTION

The primary head worn, night vision devices used by the United States (US) military are night vision goggles (NVGs). Although these devices can be monocular (one eye looking at an image), biocular (two eyes looking at the same image), or binocular (two eyes looking at two images) in design, conventional NVGs all use image intensification ($I^2$) tube technology. An $I^2$ tube multiplies ambient visible and near IR light several thousands of times. $I^2$ tube technology allows a user to see and operate in very low light conditions. In extreme low light conditions additional near IR illumination can be used. Although this near IR illumination can be seen with the aid of a night vision device, the near IR illumination is invisible to unaided human eyes.

Current night vision technologies use the visible (400-780 nanometer), near infrared (IR) (780 nanometer-1 micron), mid wave IR (3-5 micron), and long wave IR (8-12 micron) bands. The proliferation of night vision technologies has placed devices into the hands of US adversaries, thereby reducing the US military's advantage during low light operations.

The strength of night vision goggles is also one of its disadvantages. The $I^2$ tube is inherently a direct view system. Light enters objective optics on one end of a night vision device and is focused onto the $I^2$ tube. The light is amplified by the $I^2$ tube and exits the device through eyepiece optics. $I^2$ tube night vision devices can be small, light-weight, and rugged. One disadvantage with $I^2$ tube night vision devices is $I^2$ tube night vision devices can not generate an image as a video signal that can be displayed on a monitor or transmitted externally. The $I^2$ tube is also sensitive to too much light. Too much light can over saturate the $I^2$ tube and prevent the user from seeing any scene detail. This problem is called blooming or a halo effect. Therefore, an $I^2$ device can only be used in low-light conditions. In very low-light conditions, additional near IR illumination or lasers can be used. This active illumination technique can be seen by all $I^2$ devices. So if an adversary has an $I^2$ device, any opposing force using near IR illuminators or lasers may inadvertently disclose their position. Additional disadvantages are the narrow applications the night vision devices are designed for. These devices are primarily mobility devices with a fixed field of view, e.g., 40°.

An example of an $I^2$ night vision device is the Army's AN/PVS-14. The AN/PVS-14 is a monocular device that can be handheld, mounted onto a helmet or on a weapon. However, the AN/PVS-14 does not have video output, power input, or external video input capabilities. Additionally, the AN/PVS-14 does not accept alternative objective lenses other than magnifiers that narrow the field of view. Another example of a monocular night vision $I^2$ device is a commercial off the shelf (COTS) Pocket Scope MK-880 sold by OSTI. Although similar to the AN/PVS-14, the Pocket Scope MK-880 can accept external power and alternative objective lenses. But the Pocket Scope MK-880 is still susceptible to too much light, the inability to export the amplified image, and the inability to display external video.

Irvine Sensors has developed a Personal Miniature Thermal Viewer (PMTV). The PMTV is a compact thermal imager with an integrated display. The PMTV is compact, direct-view, battery operated, and can produce imagery in the mid-wave IR band. However, the PMTV can not display an external video.

What is needed is an alternative imaging device that utilizes wavelengths of the electro-magnetic (EM) spectrum currently unused in military environments.

SUMMARY OF THE INVENTION

There is a need for a device that uses the 1-2 micron wavelength band. The Direct-View, Compact Short Wave Infra Red (SWIR) Viewer is a multi-purpose device for use in rugged environments. The viewer consists of a lightweight housing, interchangeable objective lens, miniature SWIR imaging sensor, display panel, display electronics, power supply electronic board, controls, and an eyepiece. The compact design allows for the viewer to be handheld, head or helmet mounted, and/or tripod mounted. An integrated display and eyepiece allow the viewer to be a direct-view, i.e., in the direct path with the user's line of sight, device. A video signal generated by the viewer can be exported. The viewer can also display external video signals.

Unlike most night vision devices, the viewer is a multi-purpose device that can be configured to meet various tactical missions. The viewer can be handheld or head/helmet mounted and used as a mobility and target detection device. When used with long focal length optics, the viewer can be tripod mounted and be used as a long range observation device. The viewer can be used as a display for other sensors. The viewer can be combined with other night vision technologies.

More particularly, one aspect of the invention relates to a night vision device including an objective lens assembly, an image detector assembly, an eyepiece lens assembly and a housing. The objective lens assembly receives low intensity light. The image detector assembly converts the low intensity light into a visible output image. The eyepiece lens assembly provides for viewing the output image from the image detector assembly. The housing receives the objective lens assembly, the image detector assembly, and the eyepiece lens assembly. Additionally, the housing aligns the objective lens assembly with the image detector assembly and the eyepiece lens assembly along an optical axis.

Another aspect of the invention relates to the image detector assembly operating as a SWIR detector array.

Yet another aspect of the invention relates to the viewer converts the output image into a video signal for display on a display panel.

Yet another aspect of the invention relates to the viewer is combinable with other night vision devices.

To the accomplishment of the foregoing and related ends, the invention provides the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 5A is an exploded view of the monocular mount for the viewer including the head/helmet mount adapter of FIG. 4A;

FIGS. 5B and 5C are partial perspective views of the monocular mount for the viewer including the head/helmet mount adapter;

FIGS. 5D and 5E are perspective views of a left and right eye configuration of the monocular mount for the viewer including the head/helmet mount adapter;

In the detailed description that follows, identical components have been given the same reference numerals.

DETAILED DESCRIPTION

Figure 1A:
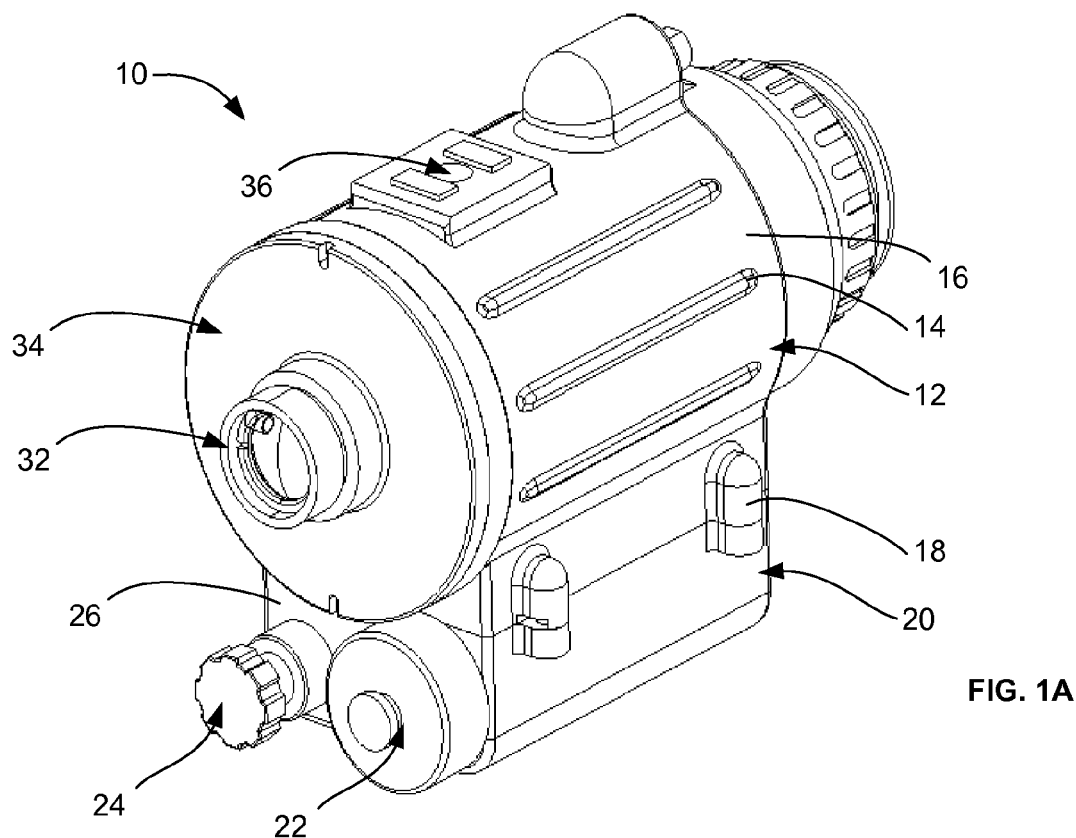
FIGS. 1A and 1B are front and rear perspective views of a Direct-View, Compact Short Wave Infra Red (SWIR) Viewer according to the present invention.
Figure 1B:
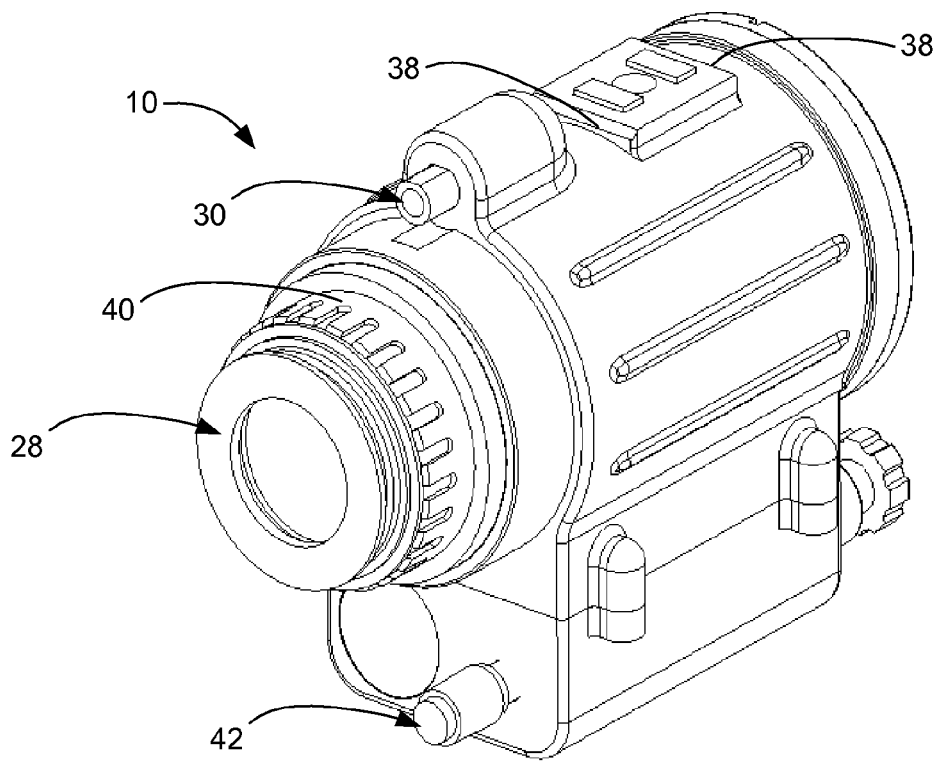

Referring now to the drawings, and initially to FIGS. 1A and 1B, a Direct-View, Compact Short Wave Infra Red (SWIR) Viewer 10 is illustrated according to one embodiment of the invention. The viewer 10 includes a center housing 12 molded from a rugged, non-metallic housing that allows the viewer to be light-weight and strong. Raised ribs 14 along an outer surface 16 of the viewer increase the gripping surface when holding the viewer. Fasteners 18, for example, screws, latches or the like, removably fasten a battery compartment 20 to the center housing 12. A removable battery cap 22 and Off/On/Display External Video knob 24 are located on a front wall 26 of the battery compartment. The battery cap 22 retains replaceable batteries which are installed coaxially. The Off/On/Display External Video knob 24, located at the front wall 26 of the viewer set's the operational mode.

The modes are Off, On, and Display External Video signal. In Off mode, the viewer 10 is non-functional. In On mode, a SWIR sensor is operating and an image is displayed through an eyepiece 28. In the event the internal or externally supplied power source is low, a low battery indicator will be presented through the eyepiece. The On/Off knob must be pulled out and turned to switch to a third position, e.g., Display External Video signal mode. The Display External Video signal mode displays an external video signal provided via an Input/Output (I/O) jack 30 to the eyepiece. A 40×30 degree field of view objective lens 32 is removably attached to a lens holder 34. The lens holder holds the lens 32 but also serves as the viewer's primary heat conducting surface. This metal component allows heat inside the center housing 12 to escape via convection.

Figure 8A:
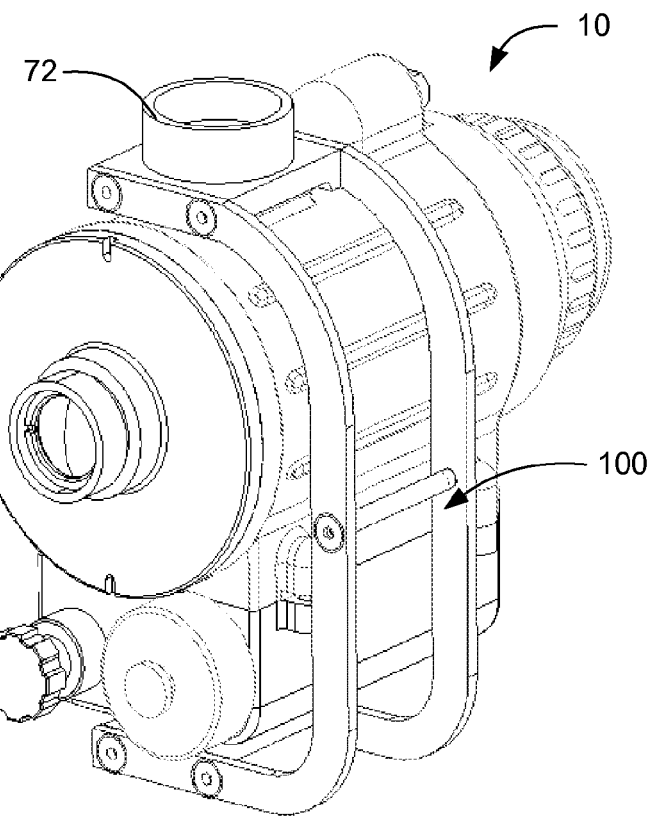
FIGS. 8A and 8B are front and rear perspective views of the viewer of FIG. 1A configured with a tripod adapter according to the present invention.
Figure 8B:
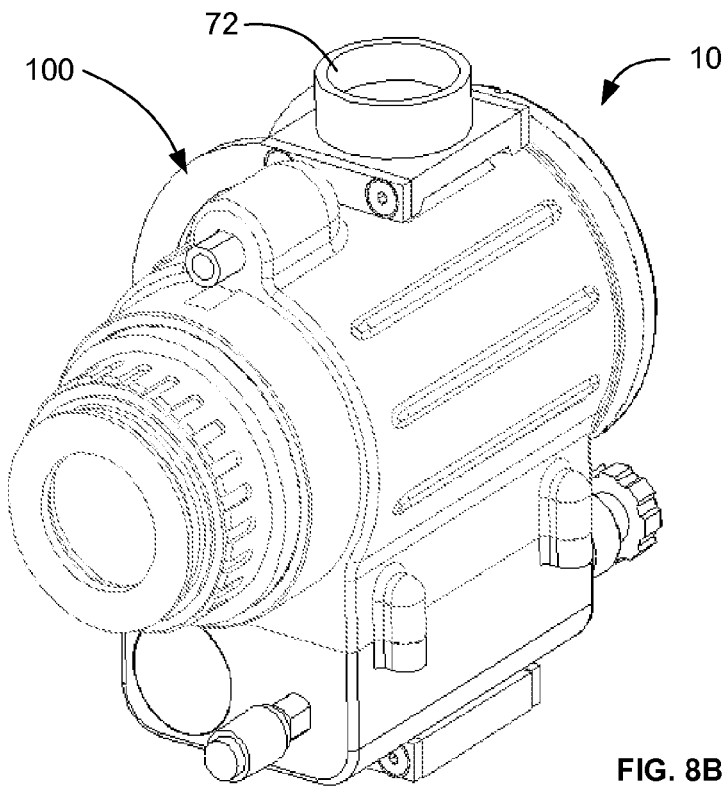
Figure 9A:
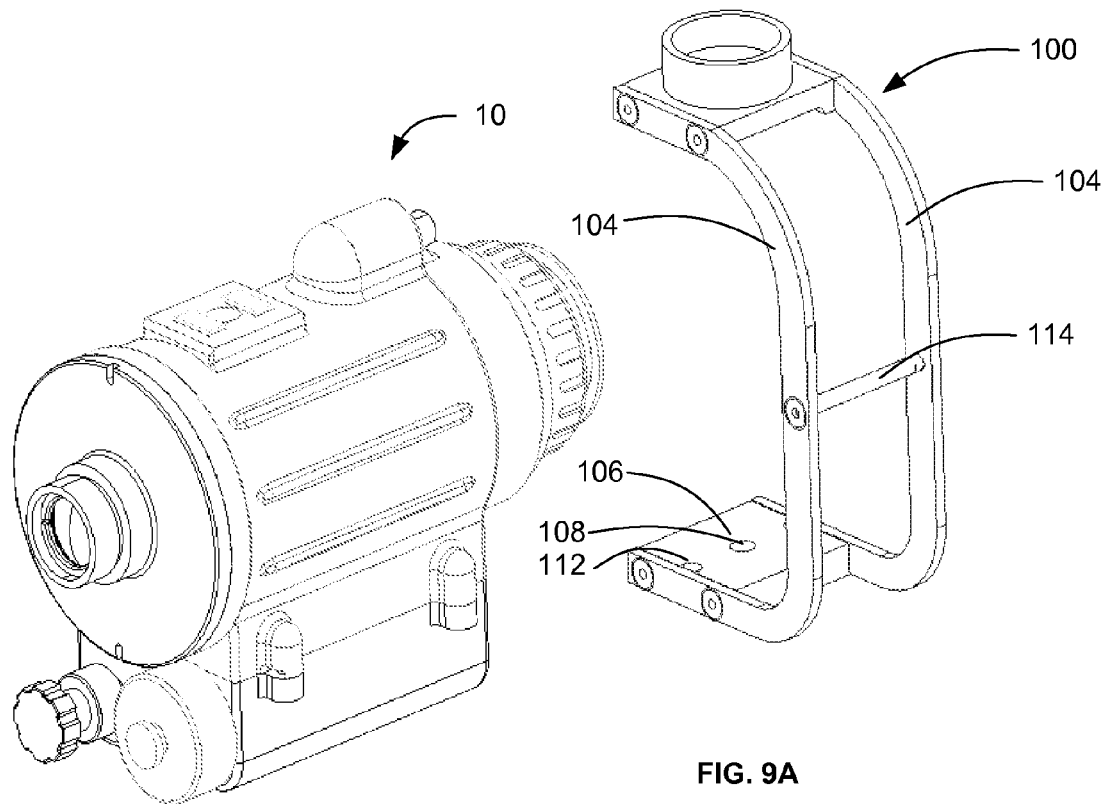
FIG. 9A is a front perspective view of the tripod adapter of FIG. 8A.
Figure 9B:
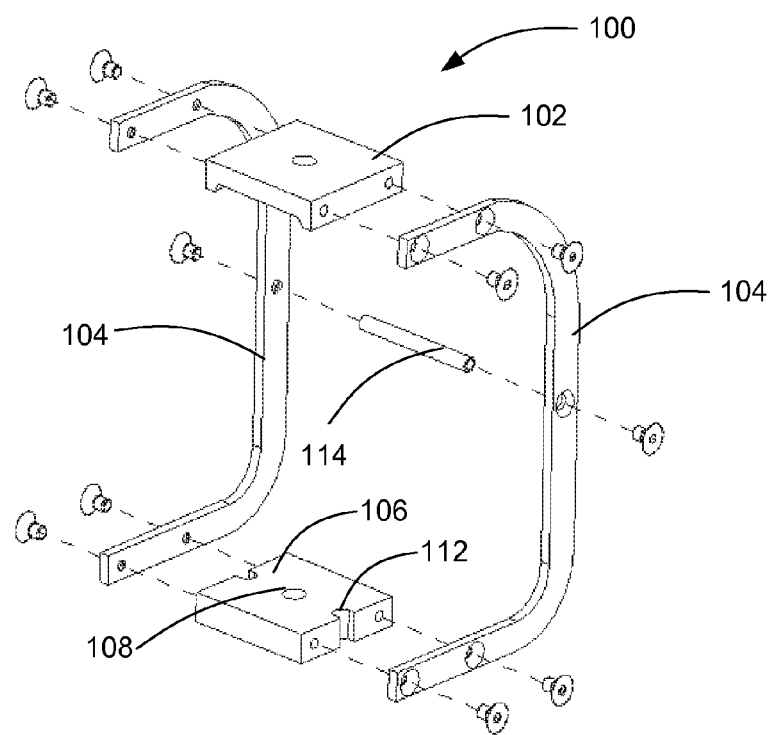
FIG. 9B is an exploded view of the tripod adapter of FIG. 8A.

A tapped hole 36, e.g., ¼"-20 UNC tapped hole, is located at the top of the viewer 10. The tapped hole 36 is used to mount the viewer to monocular or binocular helmet mounts (FIGS. 5 and 7) or a tripod bracket (mount) (FIGS. 8 and 9). Adjacent to the tapped hole are two beveled edges 38. These edges mate with corresponding beveled edges on the monocular, binocular, and tripod mounts. These self alignment features ensure the viewer and mounts are mated perpendicular to one another.

The Input/Output (I/O) jack 30 is located at the top of the viewer and protrudes rearward. Locating the jack on the top of the viewer eliminates interference with other various mounting brackets and sensor mounting combinations. Orienting the jack rearward facing, i.e., pointing toward the user's face, minimizes cable routing when used with a helmet mount and reduces the potential for being clogged by dust, dirt, or water. The jack 30 accepts power and video signals as inputs to the viewer. The jack 30 also outputs the SWIR video signal.

Accepting a wide range of external power (e.g., 6-16 VDC) allows the viewer to be powered by numerous configurations of batteries ranging from four AA 1.5 VDC sized batteries to a larger 12 VDC car battery. Current NVGs are 1.5-3 VDC devices.

The eyepiece 28, located in the rear of the viewer, focuses the image from the internal display panel to the user. An adjustable ring 40 on the eyepiece allows the user to adjust the diopter setting to improve the focus. The brightness of the display panel can be increased by turning a spring-loaded, momentary knob 42 clockwise or decreased by turning it counter-clockwise. This brightness knob 42 is coaxially aligned with the Off/On/Display External Video knob 24.

There are four steps to operating the viewer 10. Step one, turning the Off/On/Display External Video knob 24 to an operational position. Step two, adjusting the eyepiece's diopter setting for a focused image of the internal display panel. Step three, focusing the objective lens by rotating it in and out of the lens holder until the scene of interest is within focus. Step four, adjusting the display's brightness to a comfortable level.

Figure 2:
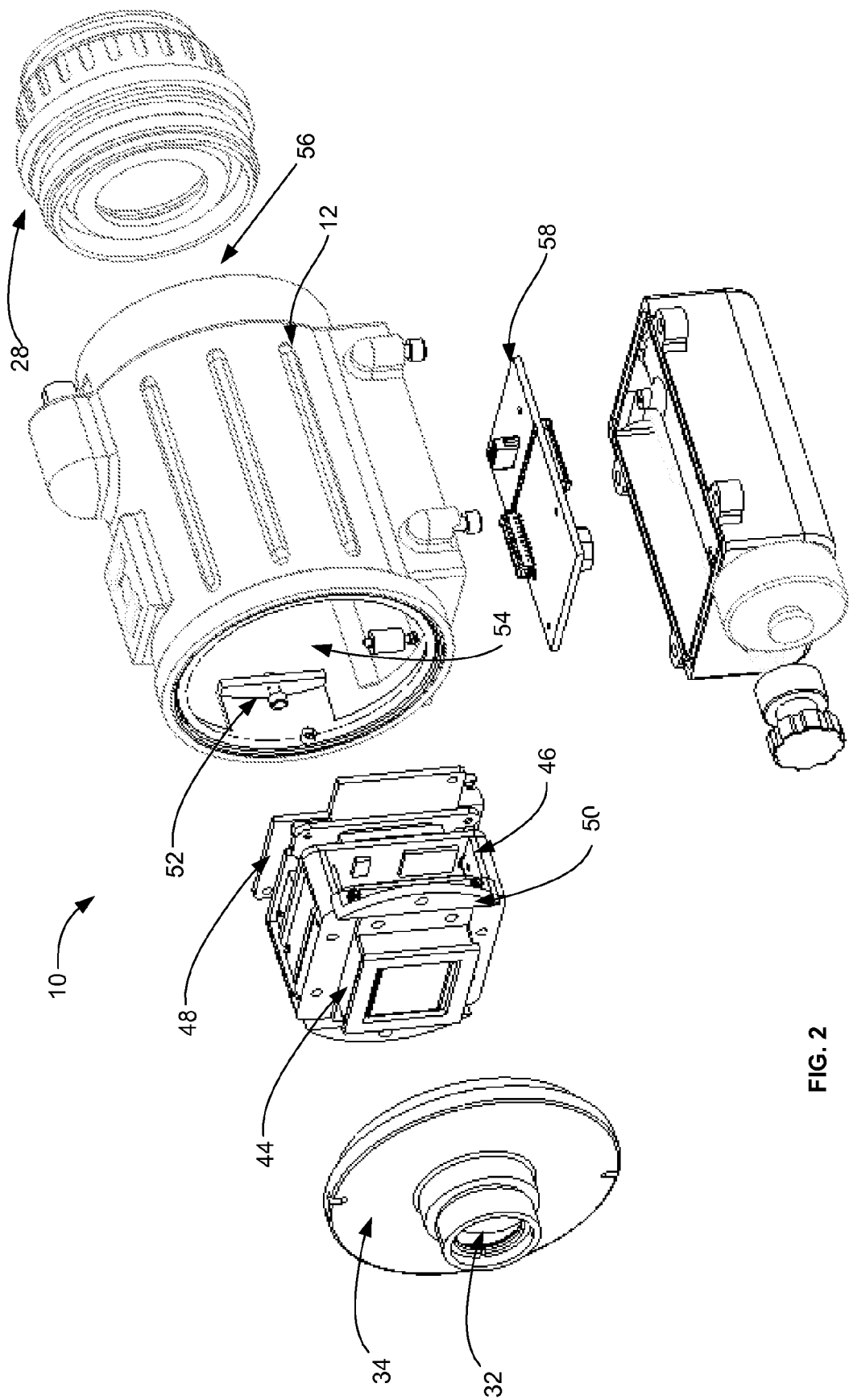
FIG. 2 is an exploded view of the viewer of FIG. 1A.

Referring now to FIG. 2, the internal components of the viewer 10 are illustrated. The objective lens 32 is removably fastened to the lens holder 34. A SWIR detector array 44 is mounted to a frame 46. The frame may be metallic, for example. The frame 46 is the structure that retains the detector 44, detector electronics, display electronics, and display panel 48.

Metallic heat sink fins 50 adjacent to the detector array extend from the frame 46. The fins 50 conduct heat from the detector 44 to a metallic mounting surface 52 bonded to the center housing 12.

The detector 44 and display assembly 48 are inserted into the center housing 12 through a front circular opening 54. The eyepiece 28 is screwed into a rear end 56 of the housing 12. A power supply electronics board 58 is located below the detector and display assembly. The power supply electronics board 58 is inserted into the housing 12 through a square opening in a bottom of the housing. The board 58 is electrically connected to the display electronics and mechanically fastened to the metallic frame 46. As is understood by those with ordinary skill in the art, a wiring harness connects the knobs and internal batteries in the battery compartment 20 to the power supply electronics board 58. Another wiring harness connects the I/O Jack 30 to the power supply electronics board 58. The modular design of the viewer 10 enable the detector 44 and display assembly 48, power supply electronics board 58, and wiring harnesses to be assembled outside of the center housing 12. This eases component level testing.

Figure 3:
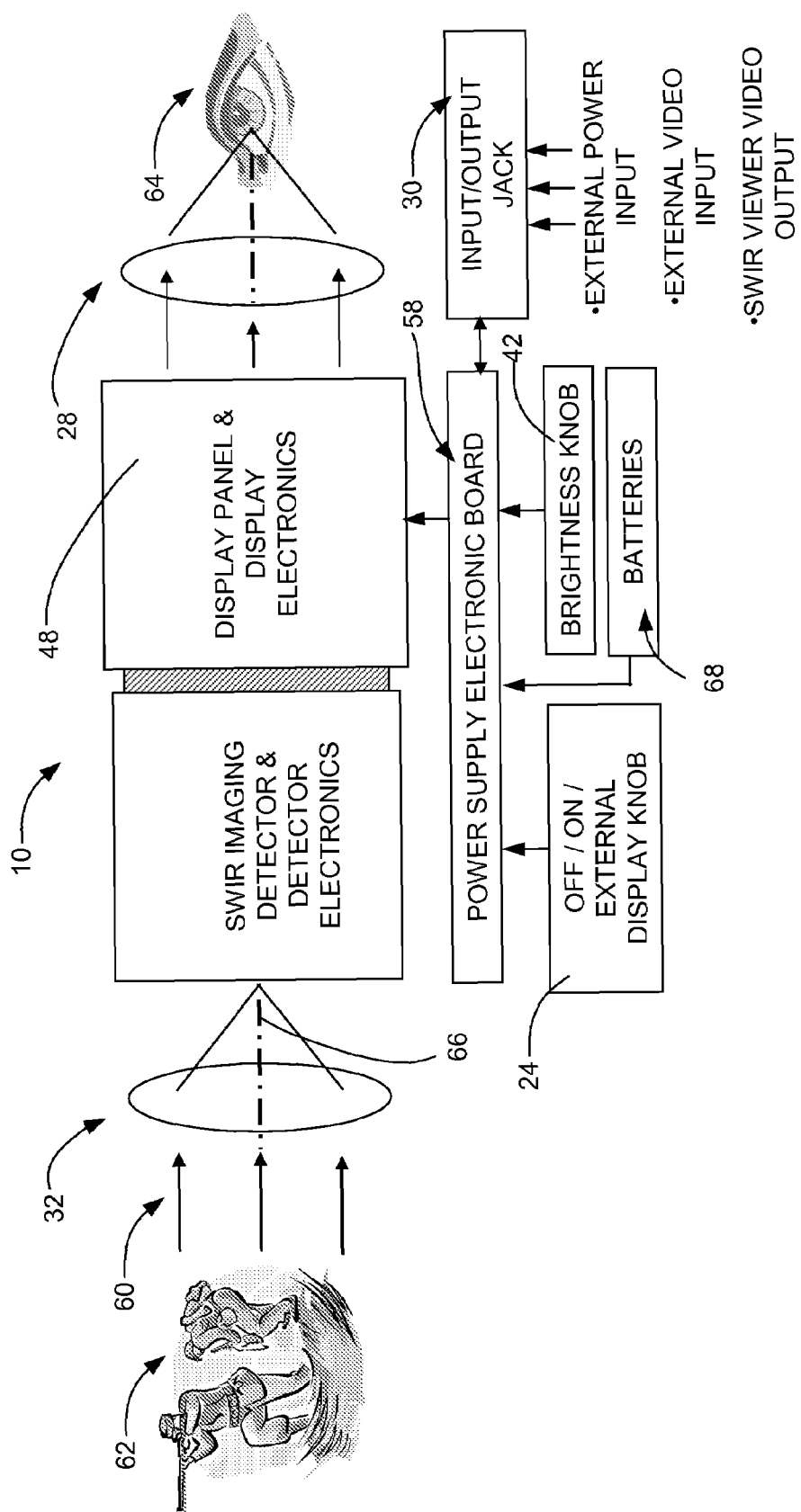
FIG. 3 is a block diagram illustrating the operation of the viewer in accordance with an embodiment of the invention.

Referring now to FIG. 3, the operation of the device will now be described. Photonic energy 60 from a scene 62 enters the objective lens 32 and is focused onto the SWIR imaging detector 44. The detector's electronics create a video signal of the scene and provides the video signal to the display electronics. The display electronics create an image from the signal and presents a visible image on the display panel 48. The eyepiece 28 focuses the image from the display panel to a user's eye 64. The SWIR imaging detector 44, detector electronics, display electronics, and display panel 48 are mechanically coupled such that the center of the objective lens, detector, display panel, and eyepiece are aligned along an axis 66, e.g., an optical axis. This alignment is identical to a purely optical direct viewing device like a telescope. The user's eye views an external scene directly through the eyepiece and objective lens along a straight axis.

The power supply electronic board 58 serves as the controlling component of the viewer 10. It accepts inputs from the Off/On/External Display Knob 24 and display brightness knob 42. The board accepts, monitors, and manages the input voltage from the internal batteries 68 and external sources of the viewer. The board 58 accepts and routes the video signal from an external source, and routes the video signal from the SWIR imager externally.

Figure 4A:
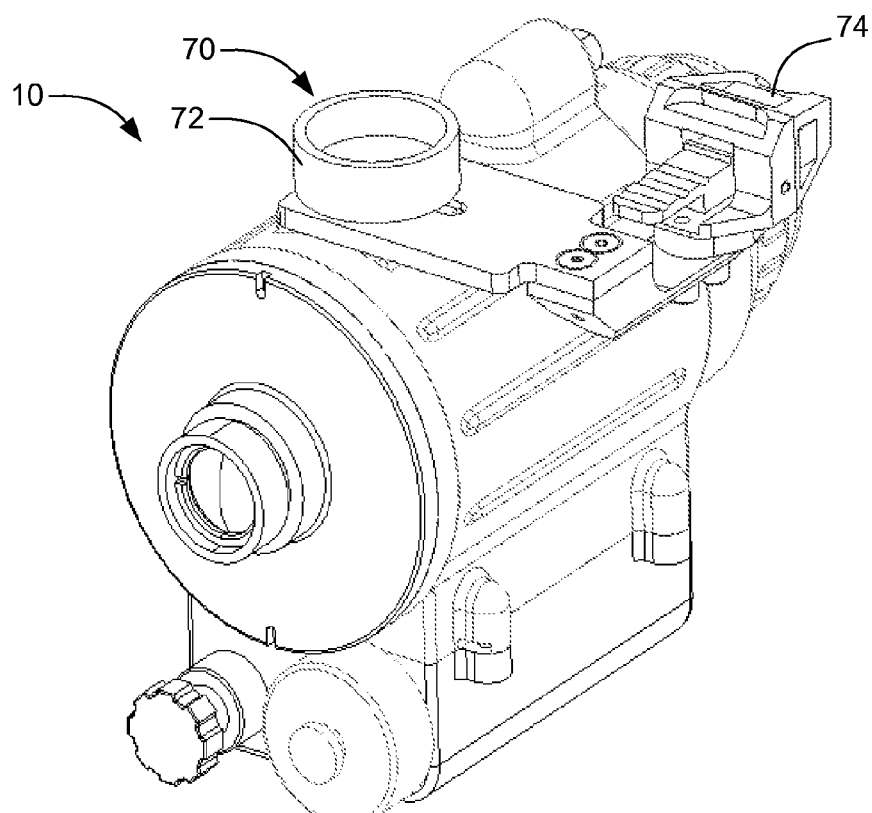
FIGS. 4A and 4B are front and rear perspective views of a monocular mount for the viewer including a head/helmet mount adapter.
Figure 4B:
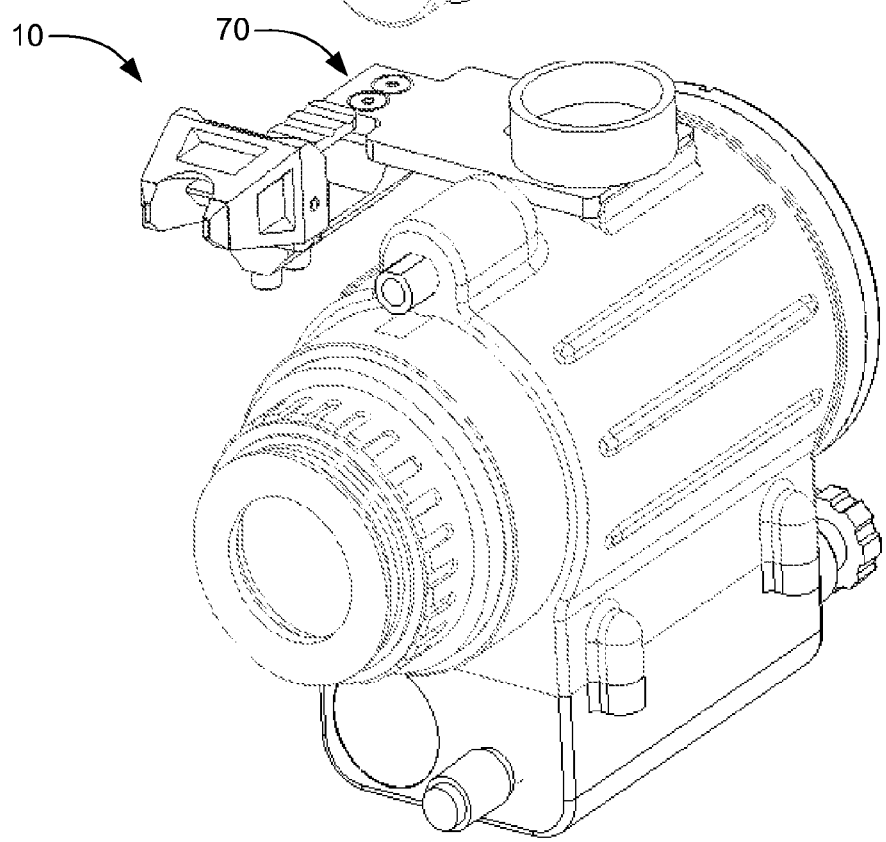

With reference to FIG. 4, the SWIR viewer 10 is illustrated in a right-eye monocular configuration. A monocular mount 70 is attached to the viewer with a removable fastener 72, e.g., a ¼"-20 UNC thumbscrew. The AN/PVS-7D Adapter 74 is a component that interfaces with standard Army AN/PVS-7D helmet mounts.

With reference to FIG. 5, FIG. 5 illustrate the monocular mount 70 in detail. The ¼"-20 UNC thumbscrew 72 is captivated in a slot 76 in a monocular bridge 78. The slot 76 allows for lateral adjustment between the center of the AN/PVS-7D Adapter 74 and the SWIR viewer's optical axis 66 of the SWIR viewer 10. One end 77 of the slot is tapped to accept the thumbscrew. A shank 80 of the thumbscrew is undercut creating a shoulder 82. This feature and the close fitting slot captivates the screw. The adapter 74 and bridge 78 are joined by a beveled member called the nose 84. A recessed pocket 86 on the underside of the monocular bridge 78 features two beveled edges 88 that mate with corresponding edges on the viewer 10. A cross section FIG. 5C illustrates how the beveled edges of the mount and the viewer mate. The monocular bridge 78 is symmetrical and can be configured in a left FIG. 5D or right FIG. 5E configuration. This allows the user to use either eye.

Figure 6A:
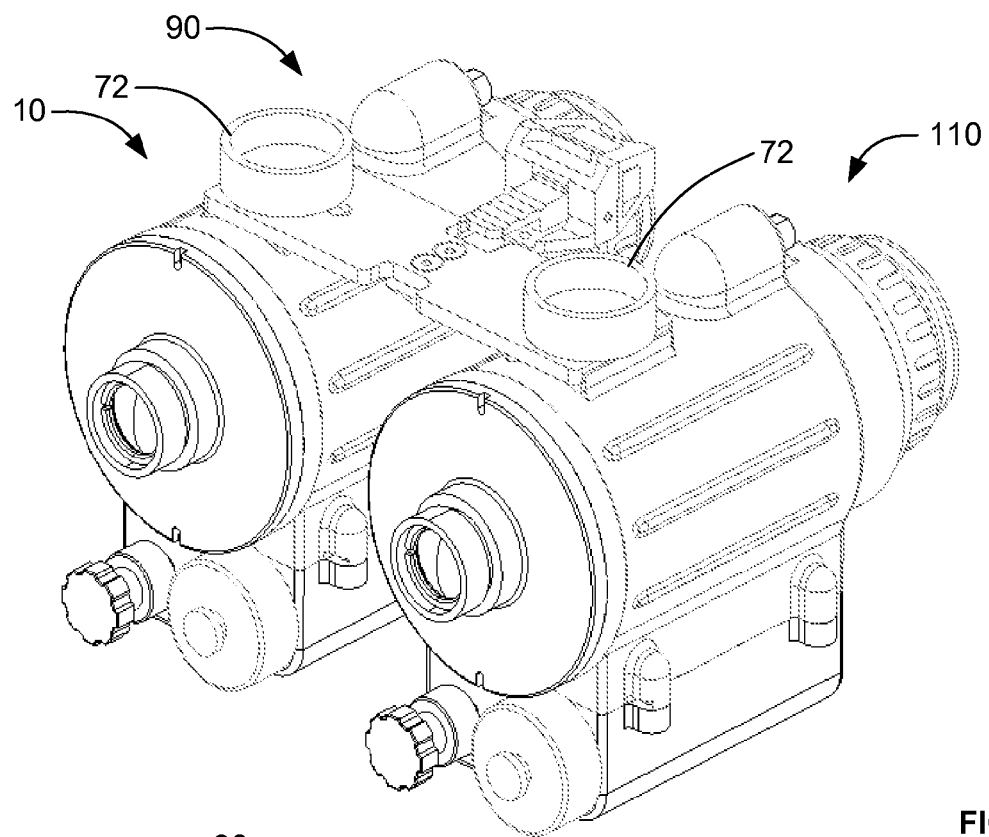
FIGS. 6A and 6B are front and rear perspective views of two viewers configured in a binocular configuration according to the present invention.
Figure 6B:
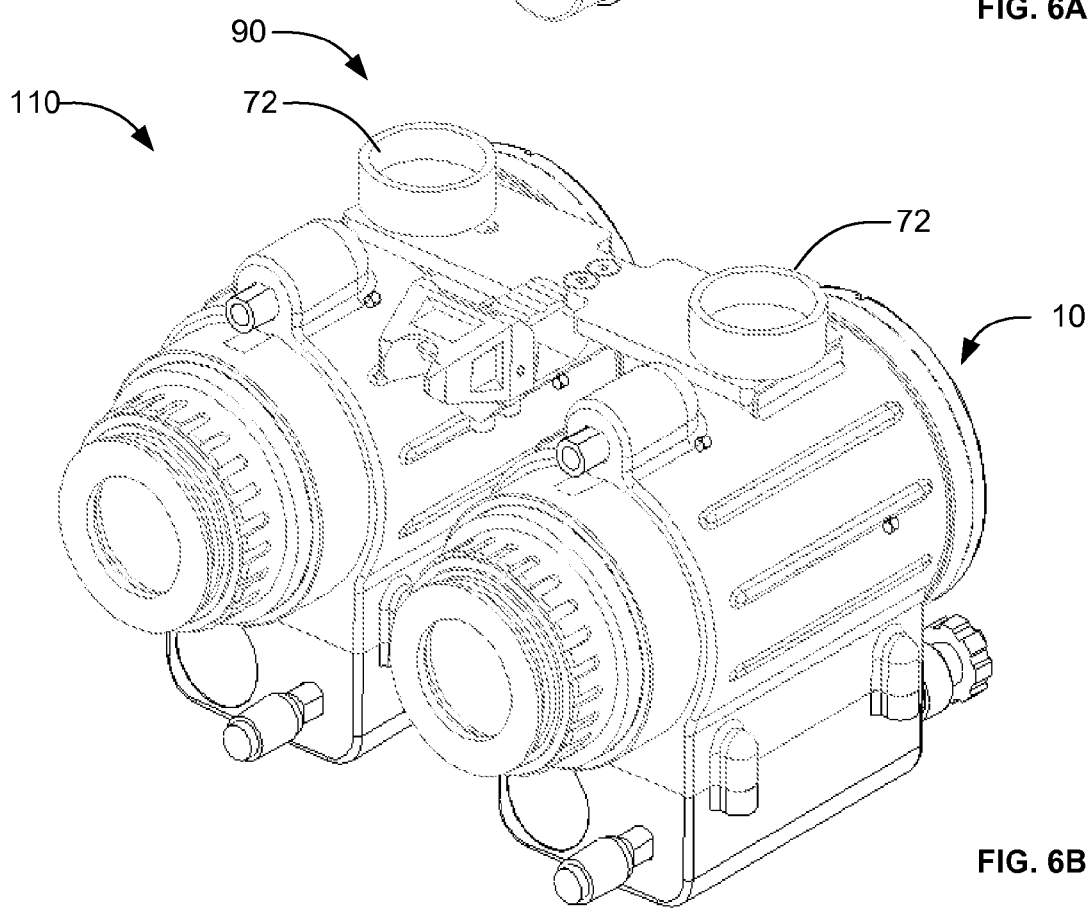

With reference to FIG. 6, FIG. 6 illustrate the SWIR viewer 10 in a binocular configuration. Two SWIR viewers 10 and 110 are joined by a binocular mount 90. Similar to the monocular configuration, the binocular mount 90 is attached to the viewers 10 and 110 with two removable fasteners 72, e.g., ¼"-20 UNC thumbscrews.

Figures 7A, 7B, 7C:
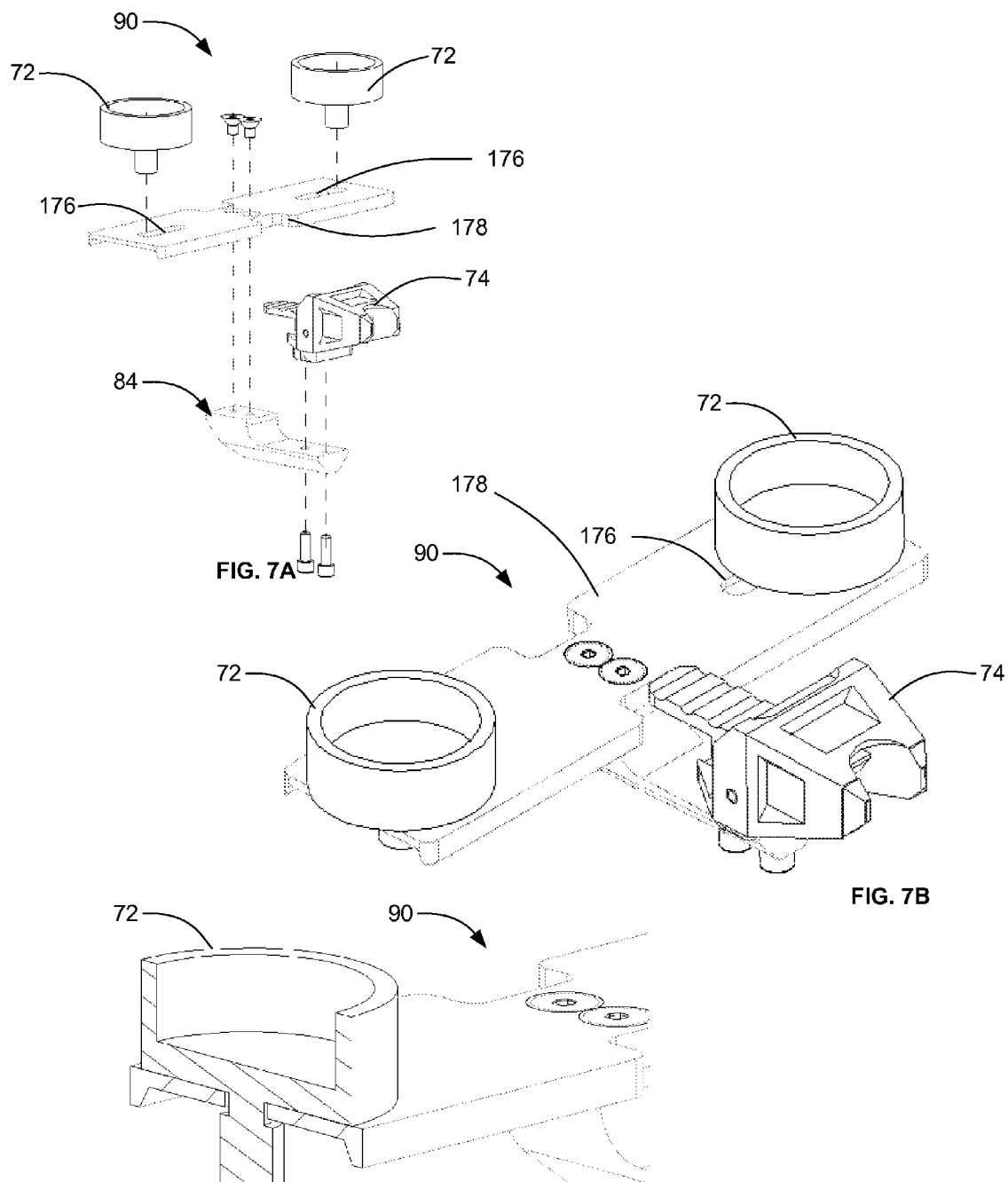
FIG. 7A is an exploded view of a binocular mount for the viewer including head/helmet mount adapter of FIG. 6A.
FIG. 7B is a front perspective view of the binocular mount for the viewer including the head/helmet mount adapter of FIG. 6A.
FIG. 7C are partial perspective view of the binocular mount for the viewer including the head/helmet mount adapter of FIG. 6A.

With reference to FIG. 7, FIG. 7 illustrate the binocular mount 90 in detail. Although the binocular mount 90 is two sided, it offers the same features of the monocular mount. Two thumbscrews 72 are used to retain the SWIR viewers 10 and 110. The screws 72 are captivated in slots 176 in the binocular bridge 178. The same AN/PVS-7D adapter 74 and nose 84 are interchangeable with the monocular and binocular mounts.

With reference to FIG. 8, FIG. 8 illustrate the SWIR viewer 10 in a configuration compatible with a standard photography tripod. A tripod mount 100 attaches to the viewer 10 with a removable fastener 72, e.g., a ¼"-20 UNC thumbscrew. The tripod mount 100 attaches to the top of the viewer 10, but provides a tapped hole at the bottom of the bracket so the viewer remains right-side up when mounted to a tripod. If the viewer 10 was directly mounted to a tripod without the bracket, the output SWIR imagery would be inverted.

With reference to FIG. 9, FIG. 9 illustrate the tripod mount 100 in detail. The thumbscrew 72 is captivated into a beveled plate 102. Two rails 104 join the beveled plate with a tapped plate 106. The tapped plate 106 has a ¼"-20 UNC tapped hole 108 in the center to accept a screw from a tripod. Two alignment slots 112 on either side of the hole accept alignment pins that are often used in tripods. Rigidity is added to the mount by a support bar 114.

Figure 10:
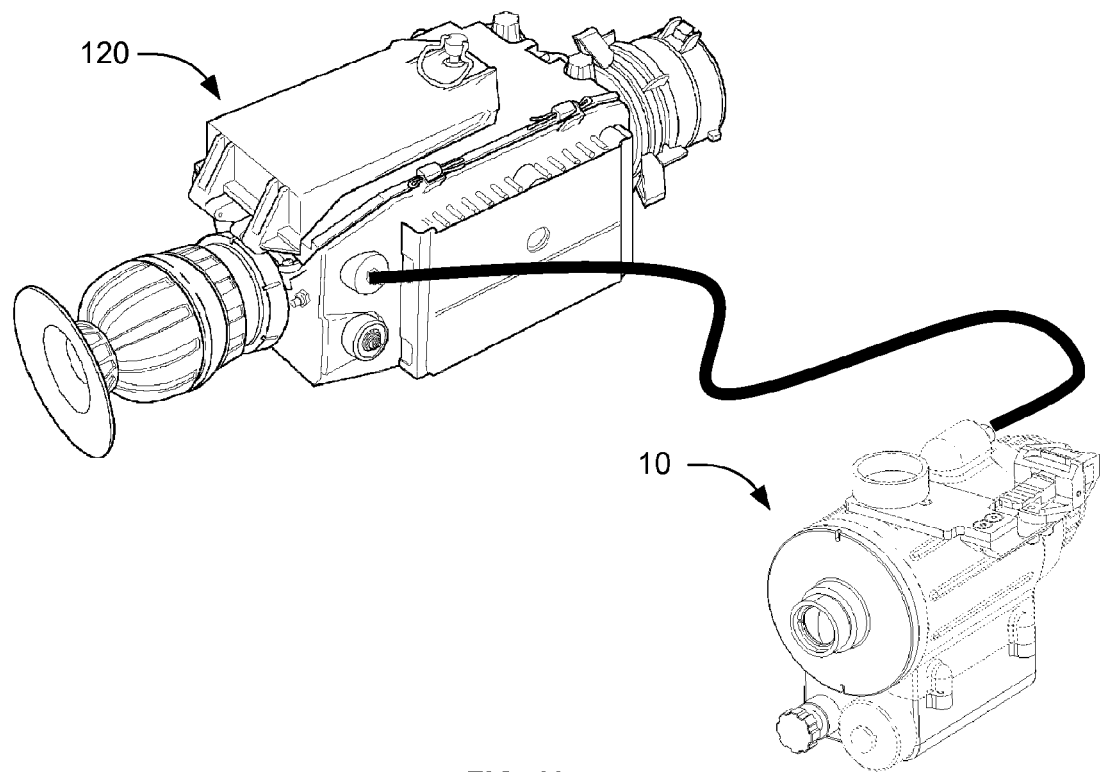
FIG. 10 is a perspective view of the viewer of FIG. 1A connected to a weapon mounted thermal weapon night sight.

Accepting an external video signal allows the viewer 10 to display alternative imagery. Therefore, when mounted to a helmet the viewer can be used as a Heads-Up Display (HUD). FIG. 10 illustrates the viewer 10 displaying the video imagery from a weapon mounted sight 120. Other video sources that can be displayed on this viewer include a computer and other imaging sensors. $I^2$ NVG devices can not do this. Although commercial and military HUDs exist, these devices are sole purpose devices. If a user wanted to use an $I^2$ NVG device and HUD, the user would have to have a device on each eye. The viewer is a dual purpose device, e.g., a SWIR imager and a HUD. It eliminates the need for two devices.

Figure 11:
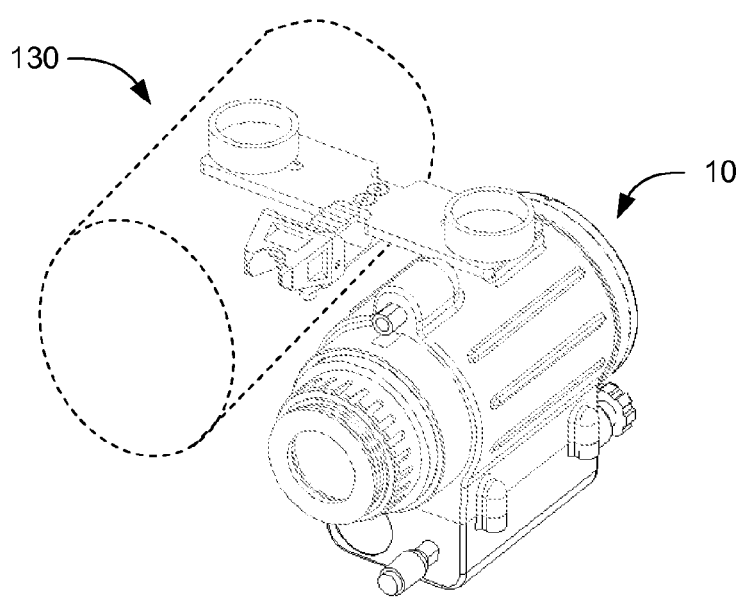
FIG. 11 is a front perspective view of the viewer of FIG. 1A illustratively connected to another night vision device.

Another application for the viewer's HUD feature is illustrated in FIG. 11. The viewer can be assembled in a binocular configuration with any other monocular imaging system 130 illustratively represented by the outlined cylinder. For example, the viewer 10 can be assembled with an image intensifier. This dual wavelength binocular assembly would enable the user to see in near IR and shortwave IR energy simultaneously. If the SWIR viewer is assembled with a thermal imager that can output its video signal, then the SWIR viewer's HUD feature could display the thermal imagery. This configuration would enable the user to see shortwave and thermal energy simultaneously. Turning the SWIR viewer to its Display External Video mode would result in a biocular (both eyes seeing the same image) thermal device.

An $I^2$ device is sensitive to the visible and near IR regions of the EM spectrum. A SWIR based device as described above is sensitive to the visible, near IR, and SWIR regions. Therefore more photonic radiation can be used to create an image. In addition, SWIR illumination can be used to aid the sensitivity of the SWIR device. This illumination would not be detectable by visible or near IR devices.

The use of the SWIR based sensor eliminates the blooming or halo effects of $I^2$ tubes. The use of an InGaAs (Indium Galium Arside) detector array is similar to a charge coupled device (CCD) camera. So it behaves like other digital cameras. The SWIR viewer is not limited to low-light level environments like an $I^2$ device. The SWIR viewer can be used in day and night. Since the detector has camera features, the video signal generated can be displayed externally. In addition digital signal processing and Automatic Gain and Contrast (AGC) algorithms can be applied to the video signal.

The size and weight of the viewer 10 allows it to be handheld, head/helmet mounted and tripod mounted. The size of typical SWIR cameras (without a display) are not handheld or head/helmet mountable.

The interchangeable lens holder of the viewer allows for the use of various objective lenses. A 40 degree horizontal field of view micro-lens can be used for mobility purposes while a COTS lens with a C-mount thread can be used for data collection.

The uni-body sensor and display assembly allow for easy assembly and troubleshooting. The entire assembly, or stack, consists of the SWIR detector, display panel, and associated electronics. It is inserted through the front of the housing. The power supply electronic board is inserted from the bottom of the housing.

The viewer accepts batteries, e.g., two (2) CR123 batteries, providing 6 VDC. The power supply electronic board up-converts the nominal 6 VDC to an operating voltage level of 8 VDC. The electronic board also provides over-voltage protection, reverse voltage polarity protection, monitors the power supply's voltage level, and detects the presence of an external power supply.

Although the invention has been shown and described with respect to certain preferred embodiments, it is obvious that equivalent alterations and modifications will occur to others skilled in the art upon the reading and understanding of this specification and the annexed drawings. In particular regard to the various functions performed by the above described components (assemblies, devices, sensors, circuits, etc), the terms (including a reference to a "means") used to describe such components are intended to correspond, unless otherwise indicated, to any component which performs the specified function of the described component (i.e., functionally equivalent), even though not structurally equivalent to the disclosed structure which performs the function in the herein illustrated exemplary embodiments of the invention. For example, a means and method may be provided for displaying an external video signal in the housing a display mechanism therein. In addition, as an alternative, provisions may be made for removably fastening the monocular, binocular, and tripod mounts to the housing. In addition, while a particular feature of the invention may have been disclosed with respect to only one of several embodiments, such feature may be combined with one or more other features of the other embodiments as may be desired and advantageous for any given or particular application.

What is claimed is:

1. A night vision device comprising:
   an objective lens assembly for receiving low intensity light;
   an image detector assembly for converting the low intensity light into a visible output image;
   an eyepiece lens assembly for viewing said output image from said image detector assembly; and
   a housing for receiving the objective lens assembly, image detector assembly, and eyepiece lens assembly, wherein said housing aligns said objective lens assembly with said image detector assembly and said eyepiece lens assembly along an optical axis, wherein the image detector assembly includes a short wave infra red detector array to convert the output image into a video signal for display on a display panel.

2. The night vision device according to claim 1 wherein the video signal generated by the detector array can be exported.

3. The night vision device according to claim 1, wherein the night vision device is head or helmet mounted.

4. The night vision device according to claim 1, wherein the night vision device is tripod mounted.

5. The night vision device according to claim 1, wherein the night vision device is configurable with another device.

6. The night vision device according to claim 5, wherein the another device is a second night vision device.

7. The night vision device according to claim 5, wherein the another device is an image intensifier.

8. The night vision device according to claim 5, wherein the another device is a thermal imager.

9. The night vision device according to claim 8, wherein the thermal imager can output thermal imagery as a video signal and the night vision device includes a heads-up display feature that can display the thermal imagery.

10. The night vision device according to claim 9, wherein a user can see short wave imagery and thermal imagery simultaneously.

11. The night vision device according to claim 1, wherein the modular design of the night vision device enables the image detector assembly, a power supply electronics board, and wiring harnesses to be assembled outside of the housing.

12. The night vision device according to claim 1, wherein the objective lens assembly is capable of receiving interchangeable objective lenses.

13. The night vision device according to claim 1, wherein the night vision device can be used in day and night.

14. The night vision device according to claim 1, wherein the display panel can display an external video signal.

15. The night vision device according to claim 14, wherein displaying the external video in the night vision device results in a binocular thermal device.

16. The night vision device according to claim 14, wherein the night vision device is sensitive to the visible, near infra red, and short wave infra red regions of the electromagnetic spectrum.

17. The night vision device according to claim 14, wherein the external video signal that can be displayed on the display are generated by a computer.

18. The night vision device according to claim 14, wherein digital signal processing and automatic gain and contrast algorithms can be applied to the video signal.

* * * * *